Oct. 17, 1950   J. ROWAN   2,526,582
GOGGLES
Filed March 28, 1946   4 Sheets-Sheet 1
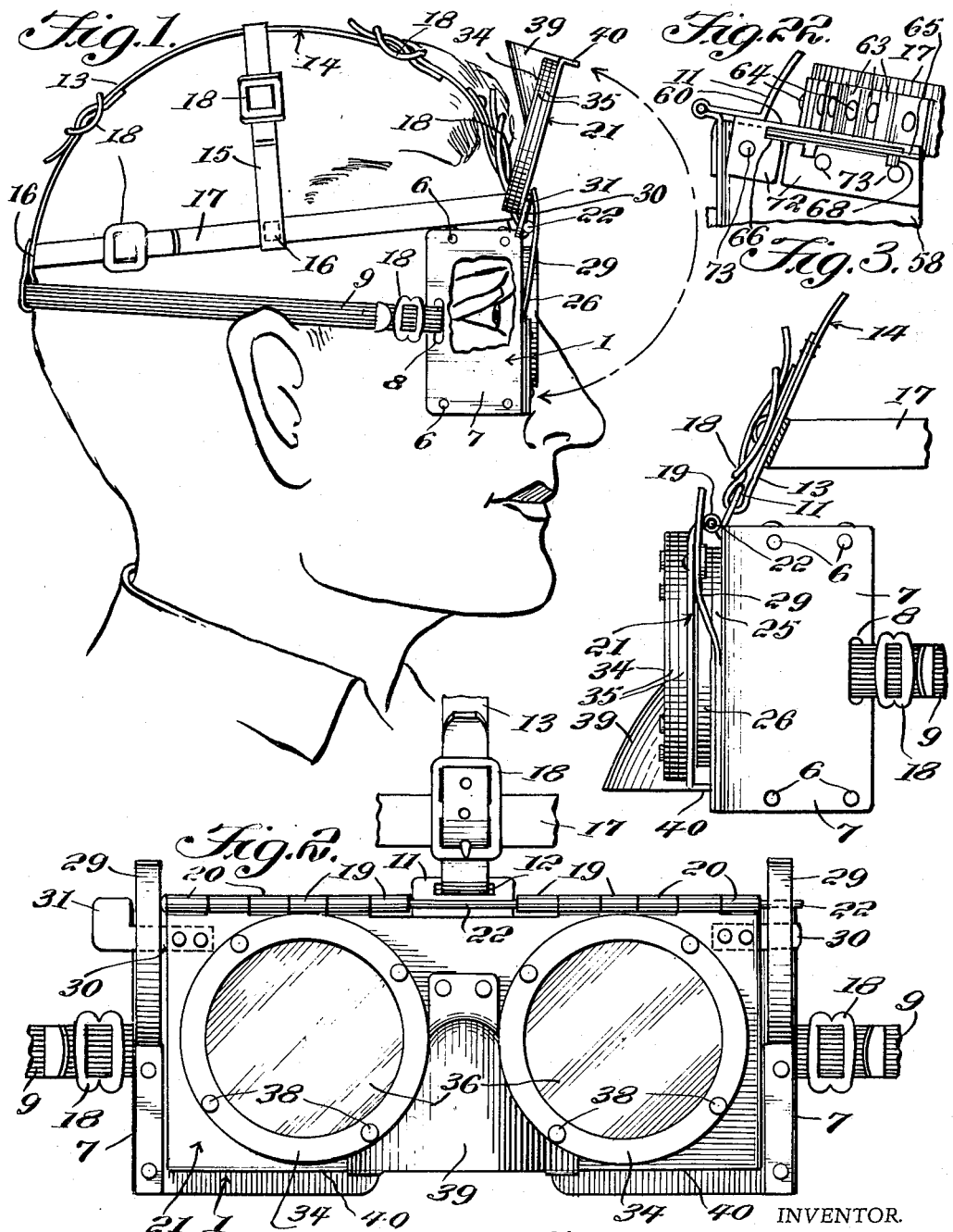
INVENTOR.
James Rowan,
BY Victor J. Evans & Co.
ATTORNEYS Oct. 17, 1950  J. ROWAN  2,526,582
GOGGLES
Filed March 28, 1946  4 Sheets-Sheet 2
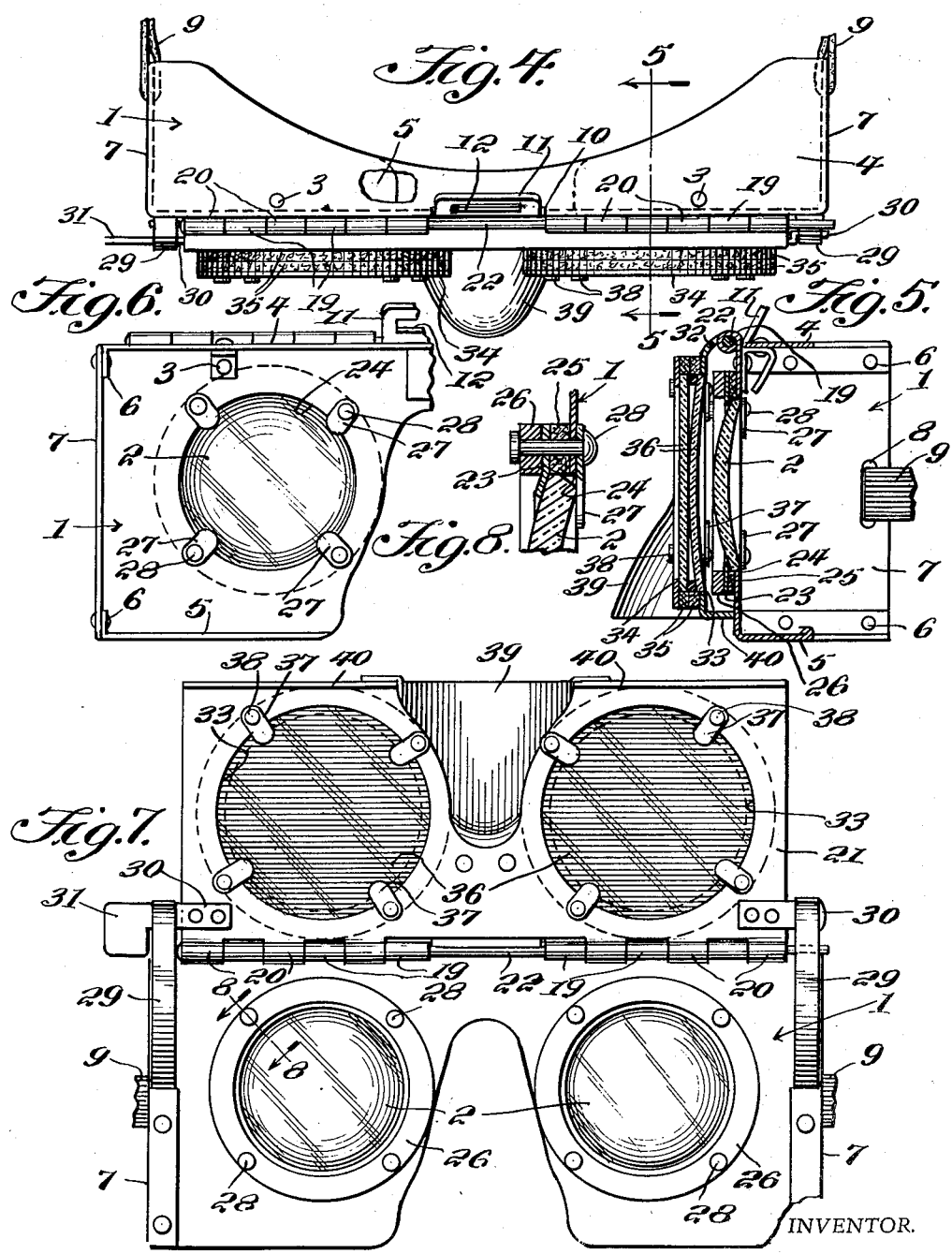
INVENTOR.
James Rowan,
BY Victor J. Evans & Co.
ATTORNEYS

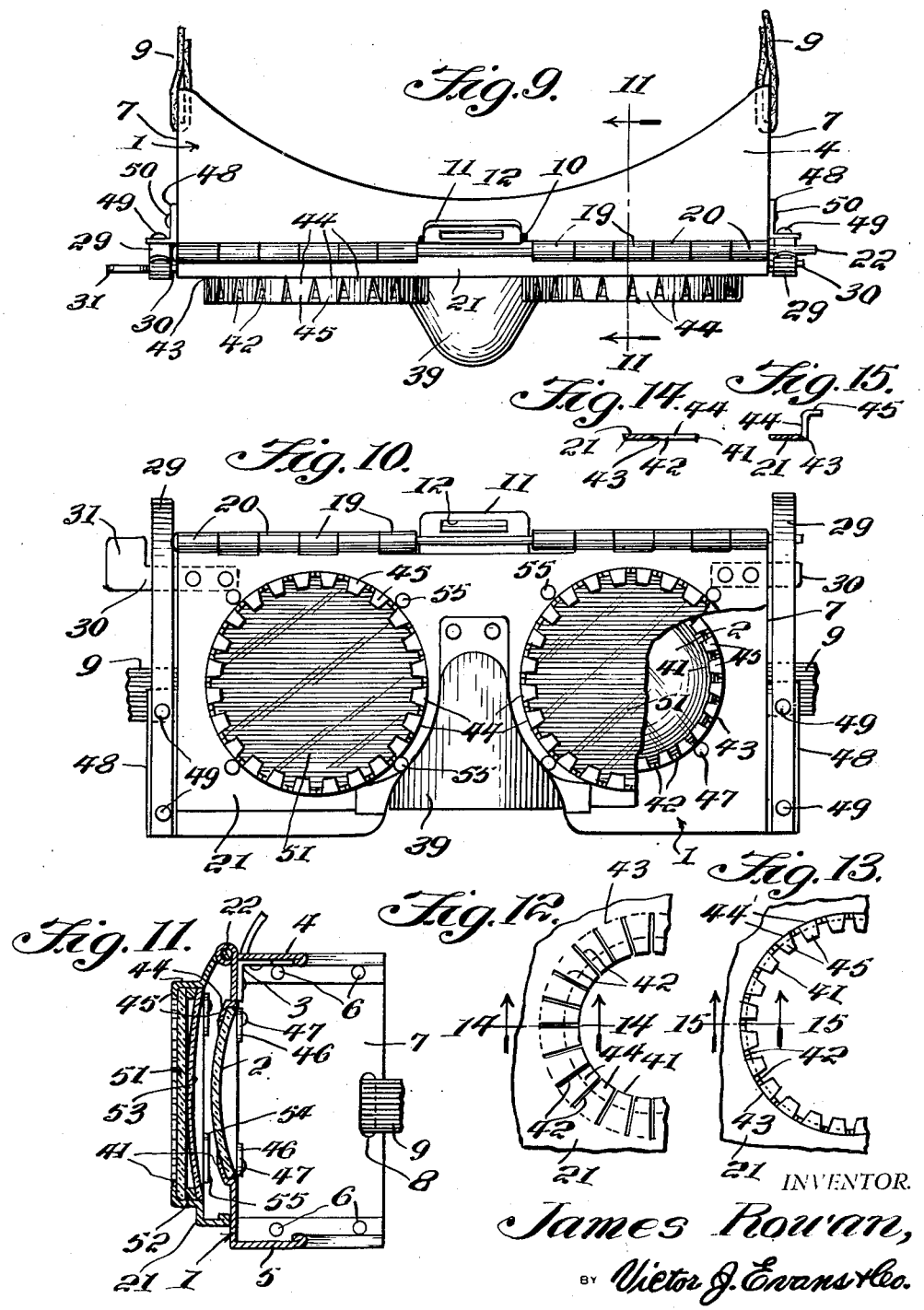

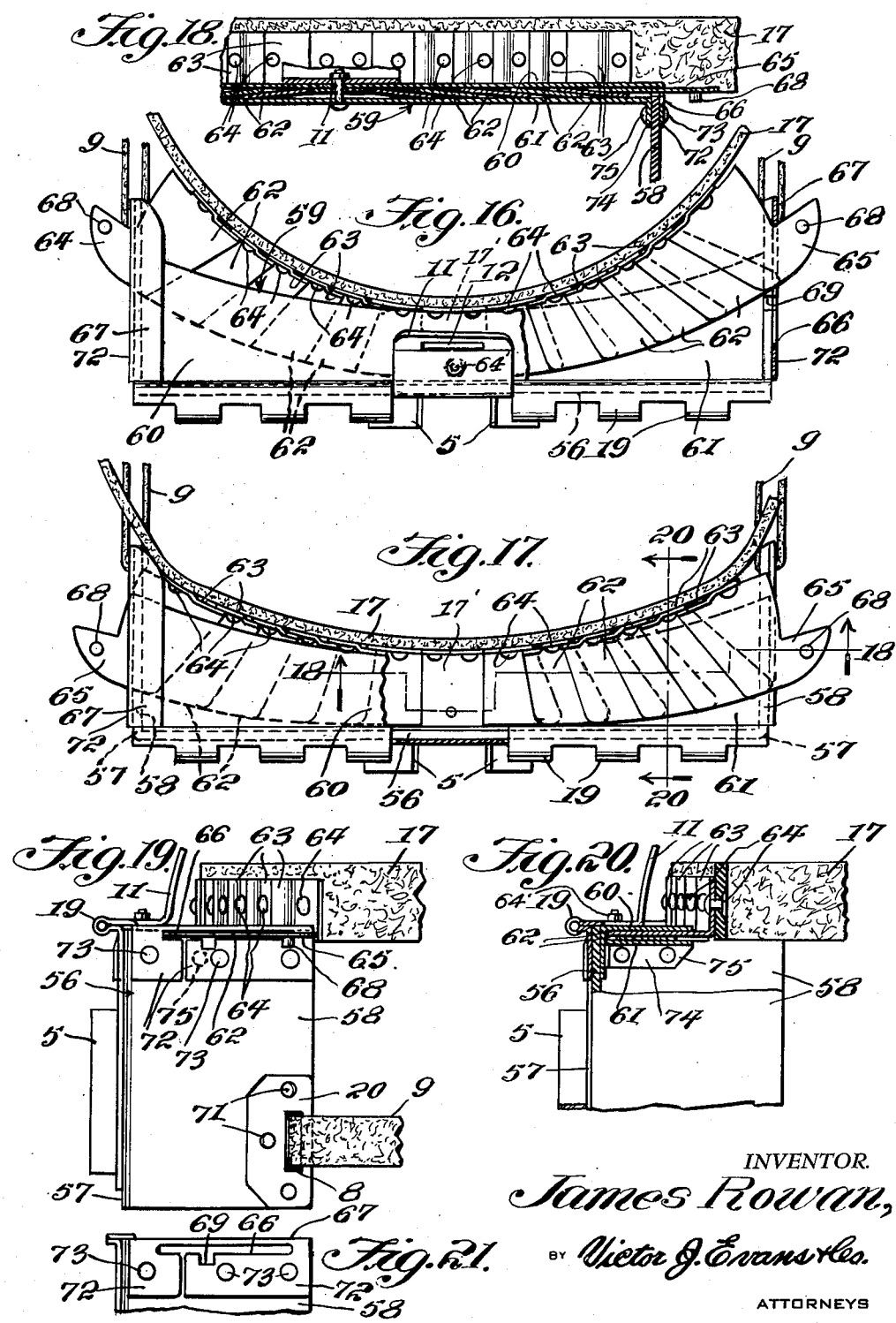

Patented Oct. 17, 1950

2,526,582

UNITED STATES PATENT OFFICE 2,526,582

GOGGLES

James Rowan, Chicago, Ill.

Application March 28, 1946, Serial No. 657,682

2 Claims. (Cl. 2—8)

My present invention, in its broad aspect, has to do with improvements in combined glasses having ground lenses adapted to adjust the deficiencies in vision of the wearer, and goggles to shield the eyes in welding and other operations, so that a person who ordinarily wears glasses to correct his vision and does welding and other work of similar character will have at all times the advantages of the glasses as well as the goggles, and may dispose the goggles out of the line of vision when it is desired to use the glasses without the goggles. Furthermore, my invention provides an improved mounting for the glasses and goggles to assure comfortable and proper support of the same on a person's head, and practical and efficient mounting of the lenses both of the glasses and the goggles, and wherein side and nose shields are provided, and the lenses so mounted as to be removable, if desired, for replacement, substitution or the like, or for disposition of the wearer's own eyeglass lenses in my device upon removal of the same temporarily from their usual spectacle frames.

Other and equally important objects and advantages of my invention will be apparent from the following description and drawings, and it is pointed out that changes in form, size, shape, materials and construction and arrangement of parts is permissible and within the purview of my broad inventive concept and the scope of the appended claims.

In the drawings wherein I have illustrated a preferred form of my invention:

Figure 1 illustrates the manner in which my combined glasses and goggles are worn by a person;

Figure 2 is a front view of my invention;

Figure 3 is a side view of my invention;

Figure 4 is a top plan view;

Figure 5 is a section on the line 5—5 of Figure 4;

Figure 6 is a detail view of the lens mounting;

Figure 7 is a front view of my device with the goggles raised up and out of the line of vision of the eye glasses;

Figure 8 is a section on the line 8—8 of Figure 7;

Figure 9 is a top plan view of a modified form of my invention;

Figure 10 is a front view thereof;

Figure 11 is a sectional view on the line 11—11 of Figure 9;

Figure 12 is a fragmentary view of the lens attaching means prior to being bent into lens holding position;

Figure 13 is a fragmentary view of the prongs raised and bent into lens holding position;

Figure 14 is a sectional view on the line 14—14 of Figure 12;

Figure 15 is a sectional view on the line 15—15 of Figure 13;

Figure 16 is a top plan view of a modified form of goggle; supporting means adjustable to fit heads of various shapes and sizes;

Figure 17 is a view similar to Figure 16 but showing the goggle supporting means adjusted for a person having a large head;

Figure 18 is a sectional view on the line 18—18 of Figure 17;

Figure 19 is an end view of Figure 16;

Figure 20 is a sectional view on the line 20—20 of Figure 17;

Figure 21 is an elevational view of the plate for attaching the supporting means to the goggles and Figure 22 shows a modified form of attaching means.

In the drawings, wherein like characters of reference are used to designate like or similar parts:

The numeral 1 designates the substantially rectangular main frame of my invention which carries the ground eye glass lenses 2 fitted to correct the optical deficiencies of the wearer. Attached to lugs or braces 3 at the top of the main frame is a curved guard shield 4 to fit and comfortably engage the forehead of the wearer to prevent entrance of dirt, chips, splinters and the like. At the bottom of the frame 1 is a similar guard shield 5 which is cut out to conform to the curvature of the nose of the wearer. Attached as at 6 to the flanged side edges of the shields 5 are side shields 7 which are substantially rectangular as shown in Figures 1 and 3. Each side shield has a slot 8 through which is adjustably engaged the resilient attaching band 9 which may be formed of rubber webbing or the like. Formed at the top edge centrally of the frame 1 and extending through the opening 10 in the top shield 4 is an ear 11 formed with a slot 12 which is engaged by the upwardly and rearwardly extending adjustable strap 13 of the head gear 14 which has an adjustable and laterally extending support strap 15. To the rear end of strap 13 and to the ends of strap 15 is attached as at 16 an adjustable head band strap 17 which connects with the strap 13 as at 9 in the front so that the frame is supported at both the top and the sides. The resilient band 9 goes through a loop in strap 13. The straps are adjustable by either buckles or sliding friction fasteners 18 as well as attaching band 9. At the top edge of the frame 1 are uniformly spaced extensions bent to form hinge barrels 19 cooperating with similar hinge barrels 20 on the rectangular goggle frame 21, to receive the usual hinge rod 22 to connect the frames 1 and 21 together. Eye glass lenses 2 are mounted back of circular rims 23 about the openings 24 and spaced therefrom by resilient washers 25. The rims carry circular guard rims 26. A plurality of turnable fingers 27 at radially opposed points hold the lenses 2 in the openings against the rims 23 with their edges engaging resilient washers 25. Long rivets 28 serve to mount the fingers 27, rims 23 and 26 and washers 25 as shown in Figures 5 and 8.

The goggle frame 21 is not as long as the main frame 1 and on the front of the side edge parts of the main frame are mounted curved upwardly extending plate springs 29 which engage lateral arms 30 on the goggle frames and press thereon to hold the goggle frames either in up or down positions as in Figures 1 and 2. One of the arms 30 has a finger extension 31 for raising and lowering the goggle frame. The top edge of the goggle frame 21 is bent back at 32, as shown in Figure 5, to properly arrange the frames with respect to each other.

The goggle frame 21 has lens openings 33 about each of which is a circular rim 34, and back of each rim 34 are circular spacers 35 so that either single or double (see Figure 5) lenses 36—one of which may be smoked or colored—may be mounted and held in place by turnable fingers 37 at diametrically opposed points by long rivets 38 similar to the mounting of lenses 2 previously described. A curved nose guard 39 is formed on or attached to the goggle frame 21 to shield the nose of the wearer. The goggle frame 21 is swung up as shown in Figure 1 when the wearer wishes to see through his regular ground lenses 2, and swung down to the position shown in Figures 2 and 5 when a welding, or similar operation, is being carried out. The goggle frame 21 has a stop flange 40 at its longer edge to abut the main frame when the goggle frame is in the down position.

In the modified form of my invention shown in Figures 9 to 15 inclusive, the frame 1 is provided with openings 41 which are of a circumference smaller than the circumference of the lenses 2. Diverging slots 42 are cut in the frame 1 and extend outwardly from the inner circumference of the openings 41 to a circle 43 concentric with the opening 41 and of a size equal to the size of the lens 2, as in Figure 12.

This forms prongs 44 which are bent upward at right angles to the frame 1, the upper ends 45 are then bent inward toward the center of the openings 41 and parallel with the plane of the frame 1, as in Figure 13. This formation provides a socket into which the lenses 2 are inserted and they are retained in position by turnable fingers 46 mounted on the frame 1 by means of rivets 47.

This method of mounting the lens is simple, yet durable. The lens are held firmly in place without the use of washers, gaskets or any type of cushioning means. Many parts are eliminated by this method. Since the frame and sockets are all in one piece, such structure is not easily damaged.

In this form of my invention, the goggle frame 21 and frame 1 are of the same width which provides a structure which differs slightly from that previously described, since the springs 29 are mounted on brackets 48 instead of being mounted on the frame 21 by rivets 49 and the brackets are mounted on the guards 4 by rivets 50. One advantage of this method of mounting the frame 21 is that it permits foreshortening of the guard shield 4 as compared with the guard shown in Fig. 4 and so aids in maintaining my device more firmly and snugly on the head.

The goggle frame 21, like frame 1, is likewise provided with prongs 44' for holding the lens 51 and back of each lens 51 are circular spacers 52 so that a second lens 53 can be mounted therein and held in place by turnable fingers 54 positioned at diametrically opposed points and retained on the frame 21 by rivets 55.

Either of these lenses may be smoked or colored and either one or two may be used.

Except for the specific mounting of the lenses, my modified form includes elements previously described. The description of these parts was, therefore, omitted since it is believed that the structure will be clear to those skilled in the art.

In the modified form of my invention shown in Figures 16 to 21 inclusive the frame 56 is made from a single piece of fiber which is bent rearwardly at 57 to form the side shields 58 and since this form only includes the particular construction for attaching the head engaging strap it is to be understood that the remainder of the structure regarding the means for attaching the lens can be either of the forms previously described including the single barrel 10 nose shield 5, ear 11 formed with the slot 12 for attachment thereto of the strap 13. The curved guard shield 59 which is adapted to engage the forehead of the wearer comprises upper and lower curved plates 60 and 61 which are spaced from each other to receive the attaching studs 62 which are bent upwardly at their rear ends at 63 to be attached to head strap 17 by fasteners 64. An L-shaped anchoring bracket 17' is also secured to the strap 17 by the fasteners 64. The bracket 17' is also received between the curved plates 60 and 61 and secured to them by a bolt 64' also passing through the ear 11, as shown in Fig. 16. The bracket 17' thus connects the strap 17 to the frame 56. The studs 62 are located on each side of this bracket 17' as shown in Fig. 17. The formation of the studs 62 and overlying formation thereof permits a flexible connection which will move with the strap 17 and conform to the head of the wearer and the free ends of the studs 62 are curved, as shown in Figure 16, and terminate in an arc. The outermost studs 62 are provided with hooked ends 65 which are adapted to be received in the slot 66 formed in the plates 67 connected to the upper edge of the side shields 58.

The hooked ends 65 are provided with studs 68 on the lower surfaces thereof to retain the hooked ends in the plate 67 and a slot 69 is formed in the plate and a corresponding slot in the side shields 58 to permit the stud to enter the plate and contact the outer side thereof.

In this form of the invention the slot 8 is covered by the slotted reinforcing plate 20 secured to the side shields 58 by fasteners 71 through which the resilient bond 9 is adjustably engaged with the frame.

The upper plate 60 is provided with ears 72 for the securing of the plate to the side shields by fasteners 73 and the lower plate 61 is provided with a flange 74 for the securing of the plate to the side shields by fasteners 75.

In Figures 16 to 21 the top edge of the side shields 58 are shown in a right angular relation with the forward edge of the frame 56. However since in some instances this type of angularity would not fit all types of foreheads the modified form shown in Figure 22 shows the upper edge of the shields 58 cut downwardly at an obtuse angle with relation to the forward edge of the frame 56. Thus this type of goggles will be more comfortable for certain types of foreheads than if the top edge of the shields were joined at a right angular relation with the frame 56, otherwise the structure is the same as previously described.

From the foregoing, it is believed that the operation and advantages of my invention will be apparent, but it is again emphasized that interpretation of the scope of my invention should only be conclusive when made in the light of the subjoined claims.

I claim:

1. In an eyeshield shield, the combination of a main frame adapted to fit against the face of a wearer, a pair of lenses mounted in said main frame and adapted to be aligned with the eyes of the wearer, means secured to said main frame and adapted to engage the head of the wearer for attaching said main frame to the face of the wearer with the lenses in alignment with the eyes of the wearer, a lower guide member substantially coextensive with and secured to the main frame, an upper guide member substantially coextensive with but spaced from and parallel to said lower guide member, portions depending from said upper guide member and secured to said main frame, said portions having slots therein, an auxiliary strap secured to said means and adapted to fit against the forehead of the wearer, a substantially L-shaped fastening means attached to said auxiliary strap and to the guide members equidistant from the ends of and between the same, a series of overlapping flat portions frictionally engaged between said guide members, said flat portions extending from opposite sides of said fastening means to the ends of said guide members, a series of overlapping end portions extending at an angle to said overlapping flat portions and forming extensions thereof, respectively, means securing said end portions to said auxiliary strap whereby adjustment of the curvature of the auxiliary strap to fit the forehead of the wearer will cause relative movement between the overlapping flat portions within said guide members, said flat portions preventing the entrance of foreign matter from above the eyes of the wearer to the space between said main frame and the face of the wearer irrespective of the adjustment of the auxiliary strap to fit the forehead of the wearer, the end plates of the series of overlapping flat portions extending through and slidably guided by slots in the portions depending from said upper guide member, pins on said end flat portions for limiting movement thereof in said slots.

2. In an eyeshield shield, the combination of a main frame adapted to fit against the face of a wearer, a pair of lenses mounted in said main frame and adapted to be aligned with the eyes of the wearer, means secured to said main frame and adapted to engage the head of the wearer for attaching said main frame to the face of the wearer with the lenses in alignment with the eyes of the wearer, a pair of spaced guide members extending substantially coextensive with and secured to the main frame, an auxiliary strap secured to said means and adapted to fit against the forehead of the wearer, a fastening means attached to the guide members equidistant from the ends of and between the same, a plurality of L-shaped members, each said member having a pair of leg portions, corresponding leg portions of each pair overlapping leg portions, respectively, of adjacent L-shaped members to thereby form a pair of series of overlapping leg portions, one of said series of overlapping leg portions being frictionally engaged between said guide members and extending from opposite sides of said fastening means to the ends of said guide members, means securing said second series of overlapping leg portions to said auxiliary strap whereby adjustment of the curvature of the auxiliary strap to fit the forehead of the wearer will cause relative movement between the overlapping flat portions within said guide members, said L-shaped members preventing the entrance of foreign matter from above the eyes of the wearer to the space between said main frame and the face of the wearer irrespective of the adjustment of the auxiliary strap to fit the forehead of the wearer.

JAMES ROWAN.

REFERENCES CITED

The following references are of record in the file of this patent:

UNITED STATES PATENTS

| Number | Name | Date |
|---|---|---|
| 1,890,865 | Scherz | Dec. 13, 1932 |
| 2,037,772 | Everett et al. | Apr. 21, 1936 |
| 2,270,238 | Clark et al. | Jan. 20, 1942 |
| 2,380,481 | Tillyer et al. | July 31, 1945 |
| 2,397,009 | Hurley et al. | Mar. 19, 1946 |

FOREIGN PATENTS

| Number | Country | Date |
|---|---|---|
| 89,352 | Sweden | Mar. 24, 1937 |